Figure 1:
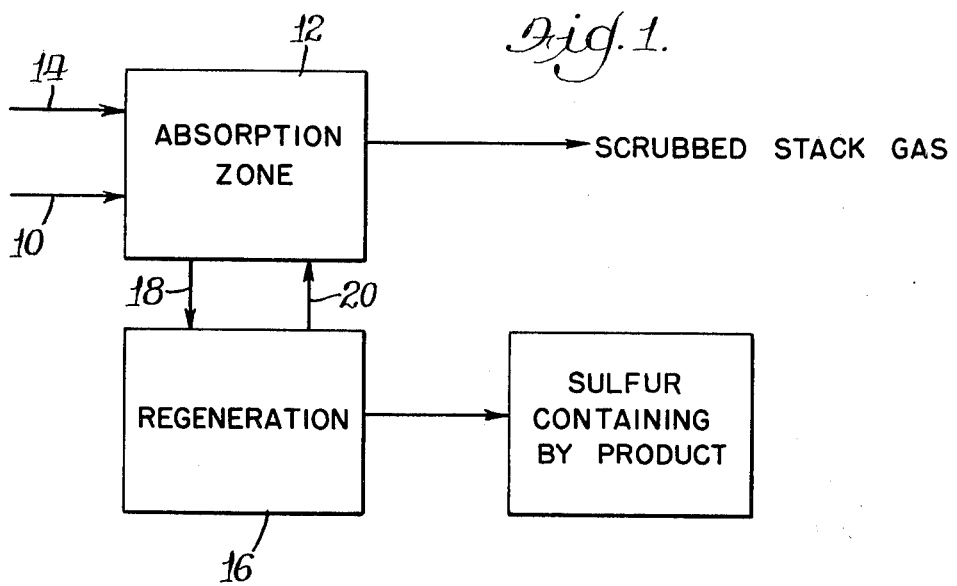

United States Patent [19]

Nikolai

[11] 4,076,793

[45] Feb. 28, 1978

[54] METHOD FOR SULFUR DIOXIDE CONTROL

[76] Inventor: William L. Nikolai, Rte. 4, Box 80, Platteville, Wis. 53818

[21] Appl. No.: 651,239

[22] Filed: Jan. 22, 1976

[51] Int. Cl.² .................. C01B 17/00; B01J 8/00
[52] U.S. Cl. .................. 423/242; 204/180 P
[58] Field of Search .................. 423/242–244, 423/50, 52; 204/180 P

[56] References Cited

U.S. PATENT DOCUMENTS

| | | | |
|---|---|---|---|
| 2,997,368 | 8/1961 | Barent et al. | 423/50 |
| 3,226,192 | 12/1965 | Atsukawa et al. | 423/242 |
| 3,251,649 | 5/1966 | Atsukawa et al. | 423/244 |
| 3,607,001 | 9/1971 | Finfer | 423/242 |

*Primary Examiner*—O. R. Vertiz
*Assistant Examiner*—Gregory A. Heller
*Attorney, Agent, or Firm*—Fitch, Even, Tabin & Luedeka

[57] ABSTRACT

A method and apparatus for removing sulfur dioxide from a gas stream such as a stack gas stream utilizing an aqueous slurry of manganous hydroxide as an absorbant and utilizing a regeneration of manganous hydroxide from manganous sulfate thereby produced.

15 Claims, 3 Drawing Figures

METHOD FOR SULFUR DIOXIDE CONTROL

The present invention is directed to methods and apparatus for pollution control, and, more particularly, is directed to such methods and apparatus for removing sulfur dioxide from combustion gases.

One of the major problems related to the generation of electrical power using fossil fuels as the energy source is the substantial environmental pollution problem posed by the presence of sulfur dioxide in the combustion product effluent gases which may hereinafter be referred to as "stack" gases. One approach to this problem has been to use low sulfur content petroleum or coal. However, the sources of low sulfur fuels are limited to the extent that such fuels are relatively more expensive than higher sulfur content fuels and are found principally in the western part of the country. In view of the transportation problem and higher cost of low sulfur fuels, the use of high sulfur fuels for the production of power is becoming a necessity. The removal of sulfur dioxide for purification of effluent gases from sulfide roasting processes is also an area of increasing importance. Accordingly, a considerable amount of effort has recently been directed toward processes for removal of sulfur dioxide from stack gases on a scale substantially exceeding such efforts in the past.

Conventional approaches to the removal of sulfur dioxide from gas mixtures have included the use of suluble bases such as sodium hydroxide and ammonium hydroxode, insoluble bases such as calcium hydroxide and magnesium hydroxide in aqueous slurries, and oxides and mixtures of oxides such as calcium oxide, magnesium oxide, iron oxide, and manganese oxides in dry solid state or in aqueous slurries. Various inorganic carbonates, phosphates, and salt solutions, such as described in U.S. Pat. No. 3,886,259, as well as organic compounds such as amines and citrates have also been used or proposed in connection with sulfur dioxide control.

However, conventional methods of sulfur dioxide removal have various disadvantages. In this regard, a substantial amount of effort has been directed to limestone absorption techniques in which the sulfur dioxide from stack gases is absorbed by limestone under aqueous conditions to produce calcium sulfite. Some air oxidation may take place, so that the byproducts of limestone absorption processes are a mixture of calcium sulfite and calcium sulfate. Limestone scrubbers based on limestone absorption processes have had difficulties involving scaling and fouling of the scrubbers by post-precipitation of calcium sulfate and calcium sulfite, and lack of efficient and stoichiometric quantitative absorption of sulfur dioxide. In addition to the technical difficulties encountered during the limestone absorption processes and with the efficiency of the absorption by limestone, there is the difficulty of obtaining a grade of limestone high in calcium carbonate content. In this connection, for example, magnesium carbonate present in the limestone may present an additional pollution problem due to the water solubility of reaction by-product magnesium sulfate. Limestone scrubbers also present the problem of the disposal of large amounts of solid sulfite-sulfate waste. Such wastes require a large land surface area for disposal.

The enormity of the waste disposal and secondary pollution problems may be considered in connection with the requirements for a conventional coal burning facility. Assuming a one percent coal sulfur content, it may be calculated that for a 1,000 megawatt power generation facility, over 400 tons per day of calcium sulfite-sulfate waste may be produced by a 100% efficient absorption process. It has been reported that a 1,000 megawatt plant may produce 1,600 tons per day of calcium sulfite-sulfate waste. While a reductive decomposition process may potentially be used to regenerate calcium oxide absorbant from the calcium sulfate-sulfate waste, such approaches involve additional capital expense, and, of course, do not solve various of the other technical problems inherent in the limestone absorption processes.

Also as indicated hereinabove, various oxides of manganese have been proposed for sulfur dioxide absorption. However, conventional processes involving the use of manganese minerals and oxides in a cyclic manner have presented other problems even though they may tend to alleviate the disposal problem of waste materials referred to in connection with limestone absorption processes. Various of the processes involving aqueous slurries of a manganese-based absorber have reaction velocities which vary from material to material and are deficient in sulfur dioxide absorption capability, and, in any event, tend to be slow, which does not facilitate large-scale operations. Moreover, regeneration of the manganese absorber from the manganese sulfate absorption product produced in various of the conventional processes has involved the use of material treatment at temperatures as high as 900° C. Heat energy input is also required for the concentration by evaporation and crystallization of the hydrate of manganous sulfate, which adds further processing expense.

In various other processes, slurry separation steps are difficult due to the colloidal nature of some of the materials used as absorbers. For example, iron oxides and freshly precipitated hydrated oxides of iron present handling difficulties due to the colloidal nature of these materials.

It is an object of the present invention to provide a method for removing sulfur dioxide from stack gases which is efficient in the removal of sulfur dioxide and which is recyclic in the use of absorbant. It is a further object to provide such a method in which the absorbant is readily handled and recovered.

Figure 2:
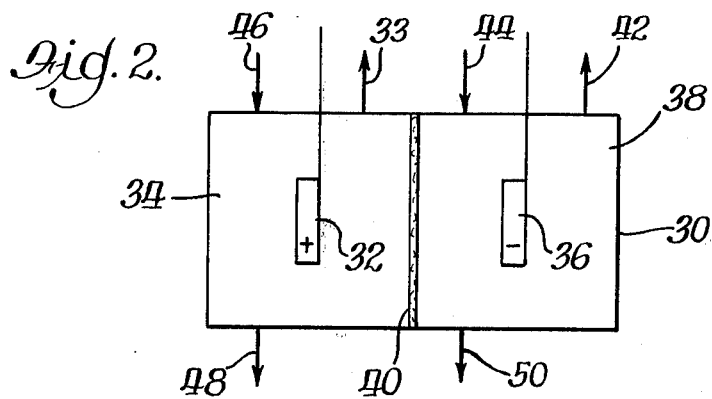
Figure 3:
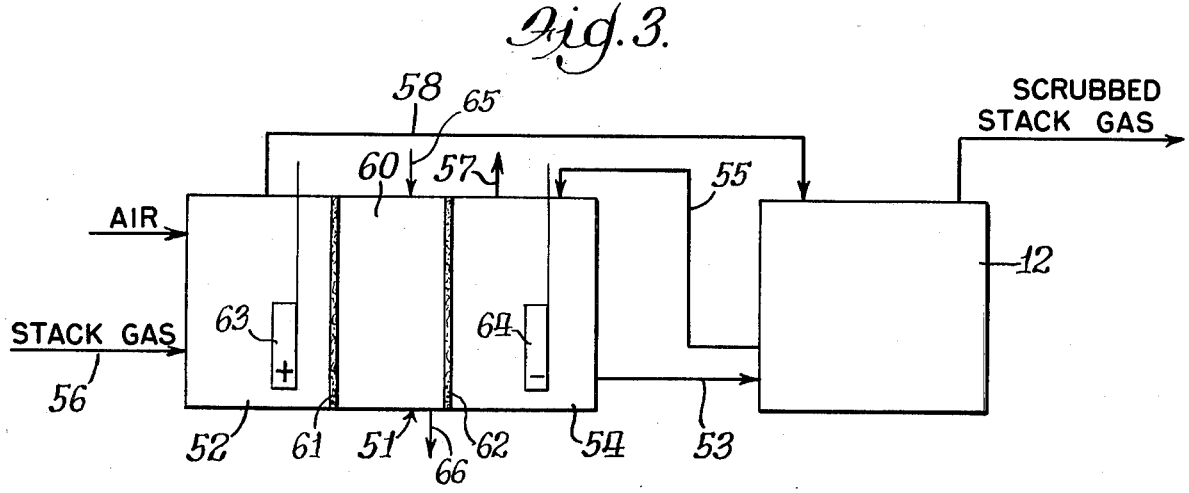

These and other objects of the invention are more particularly set forth in the following detailed description and in the accompanying drawings, of which FIG. 1 is a schematic illustration of one embodiment of the method of the present invention, and FIG. 2 is a schematic illustration of an electrolytic regeneration system suitable for use in the method illustrated in FIG. 1, and FIG. 3 is a schematic illustration of another embodiment of the method of the present invention.

Generally, the present invention is directed to a process for removing sulfur dioxide from effluent oxidation product gas, such as stack gas mixtures from a power generating facility of sulfide roaster, in which the sulfur dioxide gas mixture is conducted into contact with an aqueous slurry of crystalline manganous hydroxide absorbant to remove sulfur dioxide from the effluent gas and to produce manganous sulfate solution. The manganous hydroxide absorbant is subsequently regenerated from the manganous sulfate solution. The steps of the process can be closely regulated through monitoring and control of pH during the process. The invention is also directed to apparatus adapted to carry out the process.

Turning now to the drawings, FIG. 1 is a schematic illustration of an embodiment of the present method, and the invention will now be further described with reference to the embodiment of FIG. 1.

In the method illustrated in FIG. 1, oxidation product effluent gases 10 which contain sulfur dioxide, such as sulfide roaster off-gases or stack gases from the combustion of sulfur containing fossil fuels by electrical power generating plants or heating plants, are conducted to an absorption zone 12 for contact with an aqueous slurry of manganous hydroxide. An oxygen containing gas 14 such as air or oxygen may also be conducted into the absorption zone, either separately or together with the stack gases 10. In the absorption zone 12, the stack gases 10 are contacted with an aqueous slurry of crystalline manganous hydroxide to remove sulfur dioxide from the stack gases. Generally, while higher or lower amounts may be employed, the aqueous slurry will best contain from about 1 to about 30 percent by weight, based on the weight of the slurry, of crystalline manganous hydroxide absorbant, preferably between about 1 and about 15 percent and more preferably between about 3 and about 5 percent by weight manganous hydroxide. In this connection, for batch-operated systems, higher initial values of manganous hydroxide absorbant may be used to permit longer periods of operation before the manganous hydroxide absorbant is consumed. However, in absorption systems in which the effluent gas is passed through the slurry, slurries having in excess of about 15 percent manganous hydroxide may tend to exhibit undesirable channeling phenomena which could interfere with contact and absorption efficiency. Accordingly, operation in the range of about 15 percent or less of manganous hydroxide is preferred for continuous systems in which the manganous hydroxide is continuously or intermittently replenished during operation.

In order to facilitate handling, the manganous hydroxide in the slurry should best be in a particle size range which permits ready handling of the slurry in the particular equipment which is utilized for carrying out the process. In this regard, the manganous hydroxide in the slurry may be provided with a particle size in the range of about 0.05 to about 0.5 mm for most applications, although slurries with a particle size outside of this range may also be employed. Although they may tend to slow down a filtration recovery step, considerable amounts of smaller crystals may be employed and are of advantage relative to the sulfur dioxide absorption rate, and in any event, the crystals decrease in size as they are consumed in the process of sulfur dioxide absorption. Of course, an optimization of the particular slurry concentration and solids size distribution used in a particular application would be related to design parameters such as the type of scrubber used in the absorption zone and the type of absorbant regeneration apparatus. In this regard, the absorption zone 12 may comprise gas scrubber means adapted for use with manganous hydroxide absorbant, such as conventional effluent gas "scrubber" equipment suitable for use with an aqueous absorbant slurry. Examples of such apparatus are conventional venturi scrubber equipment and impingement plate counter current scrubber equipment.

The absorption and oxidation of sulfur dioxide by the slurry results in the consumption of the substantially insoluble manganese hydroxide at a pH of about 7, and the concomitant production of soluble manganous sulfate. The process may be operated in a batch mode in which an absorbant charge manganous hydroxide is consumed (and manganous sulfate solution produced) until a predetermined condition is reached. The predetermined condition may be an indication of a reduction of the sulfur dioxide absorbing capacity of the absorbant slurry, such as the existence in the slurry of a pH value (i.e., about 4 or less) indicating the substantially complete consumption of the manganous hydroxide. The absorption zone may then be recharged with manganous hydroxide, and the manganous sulfate solution processed to convert the manganous sulfate to manganous hydroxide for reuse in the system. In batch operation, if an initial charge of slurry absorbant consisting of manganous hydroxide in water at a pH of about 9 is placed in the absorption zone 12, the initial absorption of sulfur dioxide from the stack gas 10 causes the pH of the slurry to promptly drop to a value of about 7. The pH will remain relatively neutral until the last of the manganous hydroxide is consumed and converted to water soluble manganous sulfate. Accordingly, the process inherently minimizes corrosion problems. When the pH of the absorbant drops to a lower value such as about 4 (or less) as the last of solid manganous hydroxide disappears, the absorption of sulfur dioxide will cease, and the unabsorbed sulfur dioxide may be detected in the tail gas. As long as the solid manganous hydroxide is present in the slurry in substantial amount, however, the absorption of sulfur dioxide from the stack gas is extremely rapid and may be substantially quantitative within the limits of the absorption contact of the stack gas with the absorbant.

The process may also be used in a continuously recyclic manner in which manganous hydroxide is replenished in the absorption zone during operation to replace that consumed by sulfur dioxide removal, and the manganous sulfate produced is converted to manganous hydroxide. In continuous or intermittent recharge systems, the percentage of manganous hydroxide in the slurry may also be maintained in the absorption zone at a concentration of manganous hydroxide in the range of from about 1 to about 30 percent by weight, preferably from about 1 to about 15 percent by weight, and more preferably from about 3 to about 5 percent by weight based on the total weight of the absorbant slurry. However, it will be appreciated that the slurry concentration should be tailored to the stack gas composition and volume flow rate, the manganous hydroxide regeneration system and equipment, and the absorption zone scrubber equipment.

Generally, the manganous hydroxide absorbant slurry will have a pH of about 7 during the absorption process, and should be maintained at such a neutral pH by the appropriate replenishment of manganous hydroxide. In this connection, as indicated previously, if all of the manganous hydroxide is consumed, the pH will immediately drop to a value of about 4 in the presence of excess sulfur dioxide. The ability to maintain the absorbant slurry in a neutral pH range is a substantial advantage in connection with the prevention of process equipment corrosion problems. The manganous hydroxide will generally not be present at pH values below about 4, and pH measurement may be used as a means of monitoring and controlling the condition of the slurry in terms of the availability of manganous hydroxide in the absorption zone 12 for sulfur dioxide removal.

As indicated, the sulfur dioxide is absorbed by the manganous hydroxide slurry in the reaction zone 12, and is converted to manganous sulfate. The reaction occurring in the absorption zone 12 may be stated as follows:

$$Mn(OH)_{2(s)} + SO_{2(g)} + \tfrac{1}{2} O_{2(g)} \rightarrow MnSO_{4(aq)} + H_2O$$

As indicated, the conversion of the manganous hydroxide and sulfur dioxide to manganous sulfate consumes oxygen, and for this reason, there should be a sufficient supply of oxygen to the absorbant slurry to support the reaction. In this regard, the effluent gas to be treated may contain sufficient oxygen for this purpose. However, where there is insufficient oxygen in the influent gas, or if it is desired to add additional oxygen to enhance the reaction, air, oxygen or other oxidizing agent may be introduced into the absorption zone, absorbant slurry, and/or the stack gas. In this connection, however, the stack gases at the time of introduction into the absorption zone will preferably contain at least an amount of oxygen stoichiometrically sufficient to oxidize the sulfur dioxide contained in the stack gas.

As indicated, the process of removal of sulfur dixoide in the absorption zone consumes the solid manganous hydroxide of the absorbant slurry and converts it to water soluble manganous sulfate. The reaction between the crystalline manganous hydroxide and the sulfur dioxide is very fast, with advantage being taken of the known catalytic effect of the manganous ion on the oxidation of sulfur dioxide in an aqueous system. Moreover, it is theorized that the somewhat basic property of manganous hydroxide is utilized in the present method through the mechanism of a standard acid-base reaction with the weakly acidic sulfurous acid formed from water and sulfur dioxide, in order to facilitate the sulfur dioxide removal.

As indicated previously, the method of the present invention contemplates the regeneration of manganous hydroxide from the manganous sulfate produced by sulfur dioxide absorption, for recycle reuse in the absorption zone. In this connection, conduit means 18 is shown in the embodiment of FIG. 1 for the removal of manganous sulfate solution to a regeneration zone 16. The solid manganous hydroxide in the absorption zone 12 may be retained in the zone if desired while the manganous sulfate is conducted to the regeneration zone 16, through the use of suitable apparatus such as an appropriate filter or sedimentation basin (not shown).

The manganous hydroxide may be regenerated in the regeneration zone from the manganous sulfate by means of chemical regeneration, or by means of electrolytic regeneration. Embodiments of the process employing an electrolytic regeneration step are particularly preferred aspects of the present invention and will be more fully described hereinafter.

Manganous hydroxide is one of the few metal hydroxides which may be precipitated as an insoluble crystalline material from an aqueous solution. This property facilitates the regeneration and handling of the manganous hydroxide absorbant in the present method.

The manganous hydroxide may be chemically precipitated in a number of ways, the choice depending upon the economics of the process, the location of the plant and the availability of materials used as reactants. Chemical precipitation of manganous hydroxide is known to occur between pH values of from about 7 to about 9, beginning at a pH of 7.2 and being essentially complete at a pH of about 8.7. At higher pH values, other materials such as magnesium hydroxide will precipitate. In this connection, relatively high concentrations of materials other than the manganous sulfate and manganous hydroxide, such as magnesium sulfate and sodium sulfate may be present in the absorbant slurry and do not substantially interfere with its effectiveness as an absorber of sulfur dioxide. Accordingly, if such materials are present, it is undesirable to exceed a pH of about 9 in the regeneration of the manganous hydroxide.

Chemical methods of precipitation of manganous hydroxide which may be employed in the regeneration zone 16 include direct reaction with a basic material where the nonmanganous hydroxide reaction products are soluble or a gas. For example, the manganous sulfate may be reacted with a basic material such as sodium hydroxide, magnesium hydroxide, sodium carbonate or sodium bicarbonate to precipitate manganous hydroxide. As indicated hereinabove, the precipitation reaction occurs within a pH range of from about 7 to about 9 and the precipitation reaction may be controlled within this pH range through pH monitoring of the reaction mass. When a basic hydroxide material having a water soluble sulfate, such as sodium hydroxide or magnesium hydroxide, is used to precipitate manganous hydroxide from the manganous sulfate solution, the principal byproduct is the water soluble sulfate such as sodium sulfate or magnesium sulfate dissolved in the solution, which may be readily separated from the precipitated hydroxide crystals. The chemical precipitation should best be carried out at a temperature of from about 50° to about 100° C. and preferably from about 75° to about 85° C. The reaction should also best be carried out with suitable agitation to produce an appropriately uniformly sized crystalline precipitate. The respective precipitation reactions with sodium and magnesium hydroxides may be represented as follows:

$$MnSO_4 + 2NaOH \xrightarrow[100°\,C]{pH\ 7-9} Mn(OH)_{2(s)} + Na_2SO_4$$

and $$MnSO_4 + Mg(OH)_{2(s)} \xrightarrow[100°\,C]{pH\ 7-9} Mn(OH)_{2(s)} + MgSO_{4(aq)}$$

When a basic carbonate or bicarbonate materials having a water soluble sulfate is used to chemically precipitate manganous hydroxide from the manganous sulfate solution, carbon dioxide is an additional byproduct:

$$MnSO_4 + 2NaHCO_3 \xrightarrow[100°\,C]{pH\ 7-9} Mn(OH)_{2(s)} + Na_2SO_4 + 2CO_{2(g)}$$

$$MnSO_4 + Na_2CO_3 + H_2O \xrightarrow[100°\,C]{pH\ 7-9} Mn(OH)_{2(s)} + Na_2SO_4 + CO_{2(g)}$$

A mineral such as trona [$Na_2CO_3 \cdot NaHCO_3 \cdot 2H_2O$] may be used as a source of sodium carbonate and sodium bicarbonate. The precipitated manganous hydroxide may be returned to the absorption zone 12 with the soluble sulfate solution by means of conduit 20, or may be separated therefrom and reintroduced into the absorption zone with appropriate makeup water. The soluble sulfate may be permitted to build up in solution to its solubility limit and controlled crystallization induced, for example, by temperature variation. If the reactants are relatively pure, relatively pure sulfate salts may be produced through such crystallization procedures.

Direct chemical precipitation of manganous hydroxide through the use of basic materials such as calcium hydroxide which have insoluble sulfates may also be employed as represented by the following reaction:

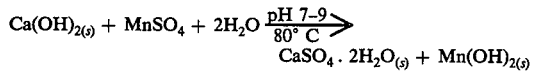

Because of the insolubility of the resulting sulfate, appropriate adaptation of the mass flow of the system will be utilized. In this connection, for example, a slurry containing both manganous hydroxide and calcium sulfate may be used as a scrubber absorbant in accordance with the following reaction scheme:

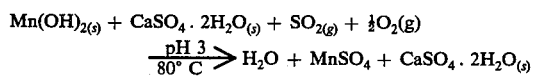

Filtration and washing of the spent slurry will provide a solution of manganous sulfate which may be employed to regenerate manganous hydroxide and gypsum byproduct. If the calcium hydroxide or lime used in the precipitation reaction is high grade, then the resulting gypsum will be high grade and may have commercial value. If silica or other insoluble impurities are present in the lime, then they will generally tend to be present in the gypsum byproduct.

If dolomitic limestone is used as a source of precipitating base, then both an insoluble sulfate (calcium sulfate) and a soluble sulfate (magnesium sulfate) will result as byproducts from the precipitation of the manganous hydroxide, as indicated by the following reaction:

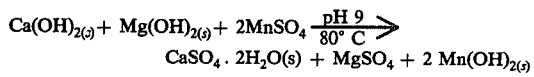

The magnesium sulfate may be carried through the process in solution and may be removed as a filtrate from the residue containing calcium sulfate and manganous hydroxide solids. It is not necessary to wash the residue, and the magnesium sulfate may be processed for magnesium recovery in accordance with known processing tehcniques. As indicated hereinabove, the magnesium sulfate may be permitted to build up in the absorption zone 12 and/or regeneration zone 16, and only a portion separated by crystallization and filtration for magnesium recovery.

However, it will be appreciated that these various methods of chemical precipitation have what will usually be the disadvantage of producing a liquid or solid sulfate salt as a byproduct.

Accordingly, a particularly preferred method of regenerating the manganous hydroxide absorbant from the water soluble manganous sulfate produced in the absorption zone 12 is through the use of an electrochemical precipitation reaction in which some of the relatively cheap, on-site generated power of an electric power plant may be employed for this purpose.

Illustrated in FIG. 2 is a schematic representation of an embodiment of the present invention which utilizes the particularly preferred electrochemical absorbant regeneration step.

FIG. 2 illustrates an electrochemical manganous hydroxide regeneration cell 30 comprising an anode 32 in an anode chamber 34 and a cathode 36 in a cathode chamber 38. The anode 32 and the cathode 36 are in electrical connection with a suitable power supply, and the anode chamber 34 is separated from the cathode chamber 38 by means of a permeable cell separator 40. Conduits 46 and 48 serve as inlet and outlet ports, respectively for filling and emptying the anode chamber 34. The actual design and operating parameter of the regeneration cell system may be tailored to the specific end use in accordance with engineering practice. In the operation of the electrochemical regeneration cell 30, an electrolyte is placed in both the anode and cathode cells 34, 38, which may initially be sulfuric acid solution in the anode cell 34 and manganous sulfate solution in the cathode cell 38. The anode 32, which may be made of a suitable material such as graphite is provided with a positive potential (with respect to the cathode) 36, which may be made of a suitable materials such as graphite, is provided with a negative potential (with respect to the anode). Under such conditions, hydrogen ions (rather than manganous ions) may be reduced in the cathode chamber 38, and the remaining hydroxide ions may be employed to precipitate the manganous ions as manganous hydroxide crystals. The half cell cathode chamber reaction may be stated as follows:

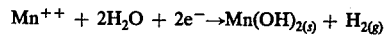

The hydrogen produced in the cathode cell is conducted from the cell by means of conduit 42, and may be recovered as a process byproduct. The oxygen produced in the anode cell 34 may, similarly, be conducted from the anode cell by means of conduit 33, and may also be recovered as a byproduct.

In operation of the cell of FIG. 2, sulfate solution from the absorption zone may be continuously or intermittently introduced into the cathode cell 38 by means of conduit 44 (corresponds to 18 in FIG. 1). The manganous hydroxide precipitate produced in the cathode chamber 38 may be continuously or intermittently returned, for example, by means of conduit 50 (corresponds to 20 in FIG. 1) to the absorption chamber 12 to replenish the manganous hydroxide which is consumed in sulfur dioxide removal.

A variety of reactions may occur in the anode chamber 34, as will be more fully described hereinafter. One of the principal half-cell reactions which may occur at the anode is the production of hydrogen ions and oxygen from water. This anode half-cell reaction may be set forth as follows:

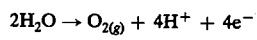

Concomitantly with the operation of the cell system to produce manganous hydroxide, the sulfate ions may migrate from the cathode chamber 38 to the anode chamber 34 and hydrogen ions and/or manganous ions (if present) may migrate from the anode chamber to the cathode chamber, through the permeable cell divider 40, to maintain the electrical balance of the cell system. In this connection, the permeable cell divider 40 should provide minimum resistance to ionic current flow while physically separating the electrolytes of the anode and cathode chamber; a porous asbestos divider is suitable for this purpose, and other types of dividers may also be used. The generation of hydrogen ions in the anode chamber and the transport of sulfate ions from the cathode chamber to the anode chamber results in the net accumulation of sulfuric acid in the anode cell and net removal of sulfate anions from the cathode cell. It will be appreciated that the precipitation of manganous hydroxide in the cathode chamber 38 would result in an excess of sulfate ions which must be accounted for in the mass balance of the system, and in this connection the sulfate ion migration from the cathode cell eliminates the necessity for raising the pH of the manganous sulfate solution through the use of a basic material in order to precipitate and regenerate the manganous hydroxide absorbant. The resulting sulfuric acid which is thereby accumulated in the anode chamber may be continuously or intermittently removed from the anode by means of conduit 48, and may be sufficiently pure to be a valuable byproduct of the process. Make-up water may be introduced into the anode cell by means of conduit 46 to prevent the development of a pressure differential across the cell divider 40 and consequent introduction of manganous ion impurity.

As indicated previously, various other types of half-cell reactions may potentially take place in the anode chamber 34 of an electrolytic manganese hydroxide recovery system depending upon the conditions of operation of the electrochemical regeneration cell 30. Various of these half-cell reactions and their half-cell potentials with respect to the standard hydrogen half-cell are as follows:

1. $(Pt)\ H_{2(g)} + 2OH^- \rightarrow 2H_2O + 2e^-$  :$E° = +0.828$
2. $Mn(OH)_{2(s)} + 2OH^- \rightarrow MnO_{2(s)} + 2H_2O + 2e^-$  :$E° = +0.05$
3. $Mn \rightarrow Mn^{++} + 2e^-$  :$E° = +1.18$
4. $H_2SO_3 + H_2O \rightarrow SO_4^= + 4H^+ + 2e^-$  :$E° = -0.200$
5. $Mn^{++} + 2H_2O \rightarrow MnO_{2(s)} + 4H^+ + 2e^-$  :$E° = -1.23$
6. $2H_2O \rightarrow O_{2(g)} + 4H^+ + 2e^-$  :$E° = -1.23$
7. $Mn^{++} + 4H_2O \rightarrow MnO_4^- + 8H^+ + 5e^-$  :$E° = -1.51$
8. $2H_2O \rightarrow H_2O_2 + 2H^+ + 2e^-$  :$E° = -1.776$
9. $2SO_4^= \rightarrow S_2O_8^= + 2e^-$  :$E° = -2.05$ It will be understood that the more "positive" the indicated potential, the greater will be the tendency of the half-reaction to occur in the anode cell. The positive oxidation potential of the manganous hydroxide half-cell (equation 2.) indicates that solid phase manganous hydroxide should not be present in the anode chamber of the electrolysis, and in accordance with the present invention, the anode chamber of the electrochemical regeneration system is maintained substantially free of solid manganous hydroxide. When the anode chamber is maintained substantially free of manganous hydroxide, then the reactions represented by equations (4), (5), (6), (7), (8), and (9), indicate possible anode reactions depending upon various conditions and methods of operation of the regeneration cell. According to the half-cell oxidation potentials it becomes apparent that if sulfurous acid (dissolved sulfur dioxide) is present in the anode chamber, that the oxidation of the sulfurous acid to sulfuric acid may take precedence over reactions with more negative half-cell potentials. Utilization of this factor will be more fully discussed hereinafter in connection with an embodiment of the invention in which the effluent gas is passed through an anode cell of the system. It will also be appreciated that the concentration of the manganous ion will be an important determining factor in the electrolytic recovery process of the scrubber system. If a high current density is used in the process, manganese dioxide may form in the anode chamber. The manganese dioxide in turn would react rapidly with any sulfur dioxide or sulfurous acid present because the oxidation potential of the sulfurous acid oxidation half-cell is more positive than that of the corresponding manganous ion half-cell. It will further be appreciated that the use of higher voltages during the process may cause reactions (7), (8), and (9), to occur concurrently with the other anode reactions. The latter reactions may also be favored by the elimination of sulfur dioxide and/or manganous ions from the anode chamber. Release of oxygen by the reaction of equation (6) would tend to cause any manganese dioxide formed on the anode to flake off into the solution to provide a manganese dioxide slurry. The presence of manganous ions would cause the oxygen formed to be utilized in oxidizing any sulfur dioxide in solution, the catalytic effect of the manganous ion being well known in this respect. The formation of any permanganate ions, persulfate ions, or hydrogen peroxide in the anode chamber is not deleterious to sulfur dioxide removal and in fact may be utilized to advantage in a suitable process configuration, because all three of these substances react rapidly with sulfur dioxide dissolved in water to produce sulfuric acid.

In this connection, an additional embodiment of the present method will be described with reference to the schematic process illustration of FIG. 3 of the drawings. In the process illustrated in FIG. 3, there is provided an absorption system comprising an electrolytic cell 51 and absorption zone (scrubber) 12. The electrolytic cell 51 comprises an anode cell 52, 60 and a cathode cell 54. The anode cell may be separated into two compartments 52, 60 by a process cell separator 61, and the anode cell and the cathode cell 54 are similarly separated by a process cell separator 62. The stack gas 56 to be purified may be introduced into contact with the liquid in the anode cell 52, and conducted along with any oxygen produced, from the anode cell into contact with the scrubber 12 (schematically shown as flow route 58) which contains manganous hydroxide slurry absorbant. The anode chamber may be separated by a suitable porous cell divider into a gas treatment and electrode 63 zone 52, and a fluid inlet and withdrawal zone 60, so that impurities from the stack gas may be isolated from the sulfuric acid byproduct in the zone 60. In the stack gas treatment portion of the anode chamber 52, the absorbed sulfur dioxide may be oxidized to sulfuric acid in accordance with various of the anode reaction mechanisms previously described, and a substantial amount of sulfur dioxide may be removed from the stack gas in the anode cell. The scrubbed effluent gas exiting from the scrubber 12 may then be released to the atmosphere substantially free of sulfur dioxide. Sulfuric acid may be withdrawn by means of conduit 66, and makeup water added by conduit 65.

The byproduct sulfuric acid from the electrochemical regeneration systems such as those illustrated in FIGS. 2 and 3 may be removed from the anode chamber and processed in accordance with conventional technology. In this connection, it will be recognized that the presence of manganous ions in the anode cell or chamber may be undesirable because the byproduct sulfuric acid produced would contain manganous ions. However, because hydrogen and manganous ions tend to migrate to the cathode, the anode electrode cell zone 60 may contain a sulfuric acid electrolyte, and the exclusion of manganous ions from the anode chamber may be facilitated by the use of an appropriate cell divider and equipment suitable for the prevention of excess differential hydrostatic pressure on the side of the cathode cell.

In the cathode chamber 54, hydrogen gas may be collected as an economically valuable byproduct from the cathode, and the hydroxyl anions produced are employed directly in the precipitation of manganous hydroxide. The slurry of manganous hydroxide and some manganous sulfate solution may continuously or intermittently be withdrawn from the cathode chamber 54 and transported by means of conduit 53 to the sulfur dioxide scrubber system absorption zone 12. From the sulfur dioxide absorption zone, the spent manganous sulfate solution may be withdrawn, and if manganous hydroxide is allowed to be present, it would preferably first be filtered from the manganous sulfate liquor and returned to the absorber. The manganous sulfate solution may be intermittently or continously fed to the cathode chamber of the electrochemical regeneration cell for regeneration of manganous hydroxide by means of conduit 55.

The following example illustrates various aspects of the present invention.

EXAMPLE

A synthetic effluent gas mixture containing 25 percent sulfur dioxide, 15 percent oxygen, and 60 percent nitrogen by volume, is introduced at a flow rate of 160 cc. per minute by means of a medium porosity sintered glass disc fused into the bottom of a jacketed glass absorber column which is 3 cm. wide and 55 cm. in length with a total capacity of 330 cc. The absorber column contains 125 cc. of an aqueous slurry containing 5 percent by weight of manganous hydroxide. Substantially, quantitative removal of the sulfur dioxide is obtained, the exiting gas failing to discolor a sulfuric acid-permanganate test solution. The temperatures are kept below 80° C. The oxygen content of the synthetic effluent gas stream can be reduced to just above the stoichiometric requirement for the oxidation of the sulfur dioxide present and still permit substantially quantitative removal of the sulfur dioxide. Substantially, the flow rate of the sulfur dioxide as stated hereinabove is calculated to be at the rate of $1.624 \times 10^{-3}$ moles per minute. This flow rate would involve an equivalent of $3.248 \times 10^{-3}$ Faradays of current per minute on a stoichiometric basis delivered at not less than about 2.5 volts for regeneration of the manganous hydroxide. The current density on the cathode would depend, of course, on the resistance of the cell and the voltage applied as well as the total surface area of the cathode immersed in the electrolyte.

A porous clay dish containing sulfuric acid solution electrolyte is placed in a beaker containing manganous sulfate solution so that the clay dish acts as a cell divider between the sulfuric acid solution and the manganous sulfate solution. A graphite electrode is placed in the manganous sulfate solution, a graphite electrode is placed in the sulfuric acid solution and a potential of up to 6 volts is applied across the electrodes so that the manganous sulfate solution is in a cathode cell and the sulfuric acid is in an anode cell. A manganous hydroxide precipitate forms in the cathode cell.

It will be apparent from the present disclosure that a beneficial method has been provided for removal of sulfur dioxide from effluent stack gases which alleviates various difficulties of conventional sulfur dioxide scrubber systems and methods. For example, problems of equipment corrosion and scrubber fouling may be minimized and effective sulfur dioxide removal realized.

The primary use for the method of the present invention is in the control of sulfur dioxide emissions from power-generating facilities and sulfide roasting facilities. Electrochemical methods may be used to regenerate the manganous hydroxide absorber and also may be used as a sulfur dioxide absorption zone ("scrubber") in conjunction with the manganous hydroxide scrubbing process. In accordance with the method, the manganous hydroxide absorber-catalyst may be regenerated by using some of the relatively inexpensive power of a power-generating facility to electrolyze the $MnSO_4$ produced in the absorption process, and to minimize the byproducts of sulfur dioxide removal.

It will be appreciated by those skilled in the art in view of the present disclosure that various modifications and adaptations may be made which fall within the spirit and scope of the present invention.

For example, if chemical regeneration of the manganous hydroxide absorbant is employed using a soluble base such as sodium hydroxide, the resulting sodium sulfate may be regenerated to provide sodium hydroxide for reuse, by cycling the sodium sulfate to the cathode compartment of an electrochemical cell in a manner similar to that described above for the cathodic regeneration of manganous hydroxide from the manganous sulfate solution. In this case, a resulting sodium sulfate-sodium hydroxide solution may be taken from the cell and sent to the regeneration zone 16, and sulfuric acid may be provided and recovered from the anode chamber. Such a procedure minimizes the need for large amounts of sodium hydroxide for chemical regeneration.

Various of the features of the present invention are set forth in the following claims.

What is claimed is:

1. A method for removing sulfur dioxide from a gas stream containing sulfur dioxide, comprising the steps of
   conducting the gas stream into contact with an aqueous slurry of manganous hydroxide absorbant comprising from about 1 to about 30 percent by weight crystalline manganous hydroxide
   absorbing and oxidizing sulfur dioxide from the gas stream in said slurry to convert manganous hydroxide in said slurry into manganous sulfate, and
   regenerating manganous hydroxide by aqueous phase electrochemical precipitation from said manganous sulfate for sulfur dioxide absorbant reuse.

2. A method in accordance with claim 1 wherein said absorption of sulfur dioxide is carried out at a pH of about 7.

3. A method in accordance with claim 1 wherein said electrochemical precipitation is carried out in the cathode cell of an electrochemical cell comprising an anode cell containing aqueous sulfuric acid electrolyte and a cathode cell containing aqueous manganous sulfate electrolyte and wherein said gas is conducted into contact with said electrolyte of said anode cell.

4. A method in accordance with claim 1 wherein said gas stream is fossil fuel combustion product stack gas, and wherein said conducting of said gas stream into contact with said manganous hydroxide absorbant slurry is carried out by venturi scrubbing.

5. A method in accordance with claim 1 wherein said gas stream is fossil fuel combustion product stack gas, and wherein said conducting of said gas stream into contact with said manganous hydroxide absorbant slurry is carried out by impingement plate countercurrent scrubbing.

6. A method in accordance with claim 1 wherein said gas stream is sulfide roaster effluent gas.

7. A method in accordance with claim 1 wherein said absorption of sulfur dioxide is carried out at an effective pH in the range of from about 4 to about 9.

8. A method in accordance with claim 1 wherein said gas stream is provided with a stoichiometric excess of oxygen over that required to oxidize the sulfur dioxide in said gas stream.

9. A method in accordance with claim 1 wherein said absorption of sulfur dioxide is substantially quantitative within the limits of the absorption contact of the gas stream with said aqueous manganous hydroxide slurry absorbant.

10. A method in accordance with claim 1 wherein said absorbant slurry comprises from about 1 to about 15 percent by weight of crystalline manganous hydroxide.

11. A method in accordance with claim 10 wherein said crystalline manganous hydroxide is provided to said aqueous absorbant slurry with a particle size of from about 0.05 to about 0.5 mm.

12. A method in accordance with claim 1 wherein said absorbant slurry comprises from about 3 to about 5 percent by weight of crystalline manganous hydroxide.

13. A method in accordance with claim 1 wherein the pH of said aqueous absorbant is maintained in the range of from about 4 to about 9 during said absorption by the addition of crystalline manganous hydroxide.

14. A method in accordance with claim 1 wherein said electrochemical precipitation is carried out in the cathode cell of an electrochemical cell comprising an anode cell containing aqueous sulfuric acid electrolyte and a cathode cell containing manganous sulfate electrolyte, and wherein said anode cell is maintained substantially free of solid manganous hydroxide.

15. A method in accordance with claim 3 wherein said anode cell comprises a gas treatment and electrode zone for contacting the gas stream, and a fluid inlet and withdrawal zone intermediate the cathode cell and the gas treatment and electrode zone.

* * * * *